United States Patent [19]

Berger et al.

[11] 3,865,694

[45] Feb. 11, 1975

[54] FERMENTATIVE PREPARATION OF L-2-AMINO-4(2-AMINOETHOXY)-BUTANOIC ACID

[75] Inventors: Julius Berger; David Pruess, both of Passaic; James Parnell Scannell, North Caldwell, all of N.J.

[73] Assignee: Hoffmann-LaRoche Inc., Nutley, N.J.

[22] Filed: Jan. 2, 1974

[21] Appl. No.: 430,335

[52] U.S. Cl. .................................. 195/80 R, 195/29
[51] Int. Cl. ............................................. C12d 13/00
[58] Field of Search ................................ 195/80, 29

[56] References Cited
UNITED STATES PATENTS
3,775,255   11/1973   Berger et al. ..................... 195/80 R Primary Examiner—Lionel M. Shapiro
Assistant Examiner—Robert J. Warden
Attorney, Agent, or Firm—Samuel L. Welt; Bernard S. Leon

[57] ABSTRACT

A process for preparing L-2-amino-4-(2-aminoethoxy)-butanoic acid by the fermentation of a known species of *Streptomyces* is disclosed. The end product so-obtained enhances ethylene production in fruit and thus has utility as an abscission agent.

2 Claims, No Drawings

FERMENTATIVE PREPARATION OF L-2-AMINO-4(2-AMINOETHOXY)-BUTANOIC ACID

DESCRIPTION OF THE INVENTION

This invention relates to the preparation of L-2-amino-4-(2-aminoethoxy)-butanoic acid by fermentation.

More particularly, the present invention relates to the preparation of the L-antipode of the compound of the formula

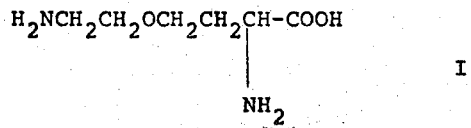

$$H_2NCH_2CH_2OCH_2CH_2CH-COOH$$
$$|$$
$$NH_2$$

I by the fermentation of the known microorganism *Streptomyces sp.* X-11085.

This streptomycete was isolated from a soil sample collected in Arlington, Calif. A viable culture of the organism labelled with the laboratory designation *Streptomyces sp.* X-11085 has been deposited in the Northern Utilization Research and Development Division, Agriculture Research Service, U.S. Department of Agriculture in Peoria, Ill., where this culture has been added to the NRRL collection under Registration No. NRRL 5331 and has been made available to the public. The species of *Streptomyces* described herein and identified as *Streptomyces sp.* X-11085 includes strains of *Streptomyces* which produce the compound of formula I and which cannot be definitely differentiated from the strain NRRL 5331 and its sub-cultures including mutants and variants. By the term "mutants" as used herein there is intended mutants produced from the described organism by various means such as chemical mutagenic agents, ultraviolet radiation, x-radiation, phage exposure and the like. A description of this microorganism based upon characteristics such as amount of growth, pigment, morphology, etc. is set forth in U.S. Pat. No. 3,751,459 issued Aug. 7, 1973, in the names of Berger, Pruess and Scannell.

Cultivation of the organism *Streptomyces sp.* X-11085 to produce the desired compound of formula I may be carried out utilizing a variety of fermentation techniques. In general the following basic techniques can be employed in both flask and tank procedures.

In the flask fermentation a loopful of spores from an agar slant of the culture is inoculated into 100 ml of nutrient medium in a 500 ml Erlenmeyer flask and incubated at about 28°C on a rotary shaker for up to 3 days. The inoculum nutrient medium contains a nitrogen source, preferably selected from an acid or enzyme hydrolyzed protein source such as enzyme hydrolyzed milk products, enzyme hydrolyzed bean meal products and the like, a carbohydrate source such as glucose; and inorganic salts such as phosphates, sodium chloride, and the like. Trypticase soy broth (pancreatic digest of casein, 15g/liter, enzymatic digest of soybean protein, 5g/liter, dipotassium phosphate, 2.5g/liter, dextrose, 2.5g/liter and sodium chloride, 5g/liter) prepared by the Baltimore Biological Laboratories is the preferred inoculum medium. After incubation in the inoculum medium for up to three days small samples of the broth are tranferred to the culture medium where they are incubated at about 28°C on a rotary shaker for from about 1 to 5 days. Whole broth samples are aseptically removed periodically for determination of the course of fermentation, usually every second day. For preparation of larger volumes of broth, inoculum is first prepared in 6 liter Erlenmeyer shakeflasks or in 5 gallon pyrex bottles, fitted for aeration, sampling etc. This broth is then transferred to the tank fermentors. Aeration in bottles and tanks is provided by forcing sterile air through the fermenting medium. In tanks, further agitation is provided by mechanical impellers. Antifoam agents such as lard oil, soybean oil, silicone surfactants, etc. are added as needed to control foam.

*Streptomyces sp.* X-11085 may be cultured in a variety of liquid culture media. Media which are especially useful for the production of the compound of formula I include an assimilable carbon source such as starch, glucose, molasses and the like, an assimilable nitrogen source such as protein, protein hydrolysate, polypeptides, amino acids, corn steep liquor, ammonium salts, and inorganic cations and anions, such as potassium, sodium, calcium, magnesium, sulfate, phosphate, chloride etc. Trace elements such as cobalt, copper, iron, molybdenum, boron etc. are supplied as impurities of other constituents of the media.

Illustrations of the types of media that are preferably used for the production of the compound of formula I are presented in Table 1. Complex nitrogenous material from varying sources will support production of the compound of formula I, for example plant materials such as soybean flour, animal materials such as meat meal digest, and microbial materials such as yeast. Addition to the fermentation medium of ethanolamine or homoserine or combinations of these two materials has been found to enhance the yields obtained for the compound of formula I.

A number of carbon sources permit good growth and production of the desired compound of formula I, for example, glucose, glycerol, dextrin and corn starch. In addition to the inorganic salts already present in natural media, supplementation with salts such as potassium phosphate, calcium carbonate, magnesium sulfate and trace elements will sometimes increase growth and yield of the compound of formula I (depending on the constituents already present in the basal medium). One of the preferred media for production of the compound of formula I in large fermenters contains in grams per liter: glucose 10.0; enzyme hydrolyzed protein such as Bacto peptone prepared by Difco 5.0; yeast extracts such as Bacto yeast extract prepared by Difco 3.0; and $Fe(NH_4)_2(SO_4)_2 \cdot 6H_2O$, 0.031.

After fermentation is complete a variety of procedures can be employed for the isolation and purification of the compound of formula I. Suitable isolation and purification procedures include ion exchange chromatography, partition chromatography and adsorption chromatography.

In a preferred aspect the compound of formula I is recovered from the culture medium by separation of the mycelium and any undissolved solids from the fermentation broth by conventional means, such as by filtration or centrifugation. The compound of formula I is then separated from the filtered or centrifuged broth using either ion exchange chromatography or adsorption chromatography. The adsorption chromatography procedure is preferably effected by adsorption of impurities onto a charcoal such as Norite A. The ion exchange chromatography can be performed using either a hydrogen form the pyridinium form or an alkali metal ion form, i.e. the sodium form, of an ion exchange resin. The partition chromatography is preferably effected using a silica gel support and an alcohol, water, ammonia solvent. It is of course understood that the isolation and purification of the compound of formula I can be accomplished using a combination of any of the above described techniques.

After filtration or centrifugation of the fermentation medium, thin layer or paper chromatography techniques as well as fluorometric amino acid analysis techniques can be employed to analyze for the compound of formula I. Because of the chemical characteristics of said compound, visualization of the spots can be achieved using ninhydrin spray. The chromatography may be carried out on paper but is preferably performed on silica gel glass plates or on cellulose plates.

The compound of formula I above either alone or in combination with ascorbic acid enhances ethylene production in fruits and therefore is useful as an abscission agent.

The role of ethylene in the ripening of fruits has been recognized in the art for over 30 years. It is known that the production of ethylene in maturing fruits increases while the fruit separates from its pedicel. This knowledge can be utilized to demonstrate the efficacy of an abscission compound in regard to its influence on fruit to accelerate or increase the production of ethylene. Since oranges can be considered a typical fruit representative of those amenable to treatment by chemical abscission agents, the efficacy of the compound of formula I as an abscission agent may be illustrated with respect thereto.

The ability of the compound of formula I above to enhance ethylene production is demonstrated in the following test procedure. Whole fresh green oranges and semi-ripe yellow oranges were sprayed with a 0.1% solution of the compound of formula I. The control oranges were treated with distilled water. All sprays contained 0.1% Aerosol OT (sodium dioctyl sulfosuccinate, SDS) as the wetting agent. SDS in the solutions assured a thin film like coverage on the waxy skin of the oranges thereby producing an increased surface area for the absorption of the active material. The treated fruits were then placed in polyethylene bags, glass jars or aluminum cans and sealed. Air space of the bags or cans was sampled periodically for ethylene with gas tight syringes.

Ethylene production in the reaction vessels was determined by gas chromatography. A Hewlett Packard, Series 5750B, Dual Flame Detector Research Gas Chromatograph was fitted with 10 ft. × 1/8 in. stainless steel column packed with alumina (5% $H_2O$ on neutral alumina to determine ethylene. The instrument was operated at 45°C. The carrier gas was helium with a flow rate of 25 ml per minute.

The ethylene nature of the gas measured was established by retention time in relation to pure ethylene and it was confirmed by mercuric perchlorate $[Hg(ClO_4)_2]$ reaction and mass spectrometry. Mercuric perchlorate absorbs ethylene while hydrochloric acid (HCl) releases the absorbed gas. The disappearance and the reappearance of the ethylene component of the gas was noted in samples treated first with 1-2 ml. 0.2M $Hg(ClO_4)_2$ and then with 1 ml 2N HCl.

The mass spectrum of pure ethylene gas was found to be comparable to the component measured as such and the ethylene nature of the gas produced in the reaction vessels was established.

The results for this test procedure for the green oranges are reported in Table 1. These results show that in the control sample a slight amount of ethylene was produced while the rate of ethylene production was greatly enhanced in the oranges treated with the compound of formula I. The amount of ethylene produced is expressed in microliters of ethylene/ml.

TABLE 1

Ethylene production by green oranges sprayed 1–1.3gms/orange incubated in polyethylene bags at room-temperature for 14 days

| SAMPLE | $\mu l$ E/ml |
|---|---|
| Orange + Distilled water | 0.0008 |
| Orange + 0.1% L-2-amino-4-(2-aminoethoxy)-butanoic acid | 0.0050 |

The results for this test procedure for the semi-ripe yellow oranges are reported in Table 2. These results shown in Table 2 are similar to those in Table 1 in that again the compound of formula I greatly enhanced the rate of ethylene production in the oranges.

TABLE 2

Ethylene production by yellow oranges sprayed 1–1.3gms/orange incubated in metal cans at room-temperature

| SAMPLE | $\mu l$ E/ml 10 days | 18 days |
|---|---|---|
| Orange + Distilled water | 0.0009 | 0.0007 |
| Orange + 0.1% L-2-amino-4-(2-aminoethyloxy)-butanoic acid | 0.0015 | 0.0044 |

As indicated by the above test procedures, the compound of formula I above is useful as a ripening agent or as an abscission agent in fruit. The results discussed above show that the compound of formula I when administered as the sole abscission agent enhances ethylene production. In addition, it has been found that a synergistic effect is obtained from combinations of the compound of formula I and ascorbic acid for abscission of fruit. This synergistic effect is demonstrated by repeating the same test procedures described above using green oranges, spraying the oranges with:

Treatment 1—distilled water
Treatment 2—0.1% L-2-amino-4-(2-aminoethoxy)-butanoic acid
Treatment 3-Formulation A (ascorbic acid—58.9%, Disodium phosphate—4.1%, monosodium phosphate—33.9%, copper sulfate — 0.1% and aerosol OT—3.0%—percentages in weight by weight) at 4% ascorbic acid
Treatment 4-Formulation A at 4% ascorbic acid and 0.1% L-2-amino-4-(2-aminoethoxy)-butanoic acid The result for this test procedure is set forth in Table 3 below. From these results, it can be seen that a synergistic effect is obtained from the combination of the compound of formula I and ascorbic acid for abscission of fruit.

TABLE 3

Ethylene production by green oranges sprayed 1-1.3gms/orange incubated in polyethylene bags at room-temperature for 14 days

| SAMPLE | µl E/ml |
| --- | --- |
| Treatment 1 | 0.0008 |
| Treatment 2 | 0.0050 |
| Treatment 3 | 0.0032 |
| Treatment 4 | 0.0225 |

The synergistic effect between the compound of formula I above and ascorbic acid for abscission of citrus is also demonstrated in the following field trials. These trials were conducted at Vero Beach, Fla. and the applications of the test materials were made in early May. Selected branches of Valencia orange trees were sprayed, each treatment was replicated twice using branches on different trees. Treatments were applied to run-off using a one quart carbon dioxide sprayer equipped with a single 8002 Tee Jet nozzle and a pressure of 34 psi. The non-ionic surfactant X–77 spreader (Colloidal Products Corp., Sausalito, Calif.) was added to all spray solutions at 0.5%. The composition of the sprays applied to the branches were as follows:

Treatment 1—0.4%-L-2-amino-4-(2-aminoethoxy)-butanoic acid

Treatment 2—1.0% ascorbic acid

Treatment 3—0.1%L-2-amino-4-(2-aminoethoxy)-butanoic acid + 0.1% ascorbic acid

Treatment 4—0.2% L-2-amino-4-(2-aminoethoxy)-butanoic acid + 0.2% ascorbic acid

The only rainfall that occurred during the 14 day treatment period fell on the ninth day and amounted to 0.77 inches. The maximum and minimum temperatures for the test period were as follows:

| Day | Maximum(°F) | Minimum(°F) |
| --- | --- | --- |
| 1 | 78 | 73 |
| 2 | 79 | 75 |
| 3 | 80 | 72 |
| 4 | 80 | 73 |
| 5 | 79 | 73 |
| 6 | 77 | 60 |
| 7 | 80 | 72 |
| 8 | 83 | 76 |
| 9 | 86 | 76 |
| 10 | 85 | 76 |
| 11 | 86 | 73 |
| 12 | 90 | 75 |
| 13 | 88 | 78 |
| 14 | 90 | 76 |

The number of fruit was counted on each branch at time of treatment and at 7 and 14 days after treatment. The data on the amount of fruit abscission 7 and 14 days after treatment are presented in Table 4.

TABLE 4

| Average percent[a] Fruit abscission of Valencia oranges | | |
| --- | --- | --- |
| SAMPLE | 7 days | 14 days |
| Untreated | 0 | 0 |
| Treatment 1 | 0 | 0 |
| Treatment 2 | 11 | 22 |

TABLE 4-Continued

| Average percent[a] Fruit abscission of Valencia oranges | | |
| --- | --- | --- |
| SAMPLE | 7 days | 14 days |
| Treatment 3 | 0 | 25 |
| Treatment 4 | 43 | 57 |

[a] average of two replicates

Compositions containing the compound of formula I and ascorbic acid can be applied to the fruit-bearing trees in liquid or powder formulations. Application may be made to the roots, trunks, limbs, leaves or fruit. For example, the abscission compositions can be dusted on the trees from airplanes or applied to the base of the trees in order to be absorbed by the roots. The preferred method of application and the most efficient is to apply the compositions to the trees from above in the form of an aqueous spray. If desired, an oily spray may be used.

In order to achieve the most efficient use of the abscission compositions, it is preferred to apply them from about 2 to 7 days prior to harvesting of the mature fruit. It is preferred to incorporate a conventional adhesive agent into the abscission compositions of the invention as a precaution against a rainfall occurring after application and washing the abscission composition from the fruit. Examples of such adhesive agents include glue, casein, salts of alginic acids, cellulose gums and their derivatives, polyvinyl pyrrolidone, vegetable gums, propylene glycol, invert syrup, corn syrup and the like.

These abscission compositions can contain, in addition to the compound of formula I and ascorbic acid, a water-soluble cupric salt such as cupric sulfate, cupric chloride and the like, a buffer and a surfactant. If desired, inert materials conventionally used in agriculture for applications to trees may be utilized.

In order to form the liquid spray formulations for the abscission compositions the active ingredients are dispersed in a carrier such as, for example, water or other suitable liquids. In liquid spray compositions, it is preferred to include from about 0.1% to about 0.5% by weight based on the weight of the carrier, of a surface active agent. The surface active agents may be anionic, cationic or non-ionic in character. Typical classes of surface active agents include alkylsulfonates, alkylarylsulfonates, alkylsulfates, alkylamide sulfonates, alkylaryl polyether alcohols, fatty acid esters of polyhydric alcohols, ethylene oxide addition products of such esters; addition products of long chain mercaptans and ethylene oxide; sodium alkyl benzene sulfonates having from 14 to 18 carbon atoms, alkylphenylethylene oxides, e.g. para-nonylphenol condensed with 10 ethylene oxide units or paraisooctyl phenol condensed with 10 ethylene oxide units or with two ethylene oxide units or with 16 ethylene oxide units, and soaps, e.g. sodium stearate and sodium maleate. Typical surface active agents are: sodium salt of propylated naphthalenesulfonic acids; Aerosol OT manufactured by American Cyanamide Co. New York, N.Y.; X–77 Spreader manufactured by Colloidal Products Corp., Saulsalito, Calif.; the sodium salt of modified alcohol sulfate from coconut fatty acids; the sodium salt of sulfonated monoglyceride of coconut fatty acids; the sodium sulfonate of butylbisphenyl sorbitan sesquialeate; laurytrimethyl ammonium chloride; octadecyltrimethyl ammonium chloride; polyethyleneglycol laurylether; Daxad No. 11 manufactured by Dewey and Almy Chemical Co., Cambridge, Mass. (sodium salt of polymerized alkyl aryl sulfonic acid); sodium oleate sulfate; sodium lauryl sulfate; Ethofats manufactured by Armour & Co. Chicago, Ill. (polyethylene esters of fatty acids or rosin acids); Ethomeens manufactured by Armour & Co., Chicago, Ill. (polyethylene glycol derivatives of long chain alkylamines), Tritons manufactured by Rohm & Haas Co., Philadelphia, Pa. (alkylaryl polyether alcohols, sulfonates, and sulfates of the non-ionic, cationic and anionic types) and the like.

These abscission compositions can be used to abscind a variety of fruits from trees. Typical fruits with which these compositions are efficacious include oranges, olives, apples, cherries and the like. The compositions of the invention are most efficacious in the abscission of citrus fruits, e.g., oranges, grapefruit and the like.

If, under particular application conditions, it is desirable to adjust the pH of the abscission compositions, this can be done following conventional techniques. For example, buffers such as disodium phosphate, monosodium phosphate, sodium dibasic phosphate monohydrate and the like or mixtures of these can be incorporated into the abscission compositions to adjust the pH to the desired range.

The nature and objects of the present invention can be more fully understood by making reference to the following examples. Unless otherwise indicated, all temperatures are given in degrees Centigrade.

EXAMPLE 1

Fermentation of *Streptomyces species* X-11085

A spore suspension of *Streptomyces sp.* X-11085 from a nutrient agar test tube slant was inoculated into a 500 ml Erlenmeyer flask containing 100 ml of Trypticase Soy Broth (Baltimore Biological Laboratories). The flask was incubated at 28°C for 72 hours on a rotary shaker (240 rpm with a 2 inch stroke). 2 Ml. of this inoculum was then added to 100 ml of fermentation medium containing in gms/liter: glucose 20, Bacto peptone (Difco) 5.0, Bacto yeast extract 3.0, ferrous ammonium sulfate hexahydrate 0.03.

The pH of the medium was about 7.0 before sterilization. The culture was incubated in a 500 ml shake flask at 28°C on a rotary shaker (240 rpm with a 2 inch stroke). After four days the contents of the shake flask were filtered by centrifugation. 2.1.

The undiluted broth (pH 2-2.2) (10 μl) was applied to the fluorometric amino acid analyzer[1] and eluted with standard buffers:

Buffer 1  sodium citrate  pH 3.28, 0.2M[Na+] t=0 to 66
Buffer 2  do.             pH 4.24, 0.2M[Na+] t=66 to 120
Buffer 3  do.             pH 5.5, 1.0M[Na+] t=120 to end
t=Flow rate in minutes for the buffer Other conditions: single column (50 × 0.28 cm); jacketed column
(temp = 59.5°) containing Durrum DC4A resin
Eluate flow 9.2 ml/hr
Borate flow 25.2 ml/hr
Fluramin acetone (300 mg/liter) 19.6 ml/hr
Detection Unit: Aminco Fluoro Microphotometer The peaks were well-resolved and detected most of the standard amino acids. In addition peaks appeared at
165 min
167.2 min
169.5 min
173.0 min In a second experiment a mixture of 1 ml of the undiluted broth was mixed with 1 ml of a standard solution (pH 2.2) containing L-2-amino-4-(2-aminoethoxy)-butanoic acid (50μM) and the fluorometric amino acid analysis repeated under the same conditions as above. [(1) A. Felix and G. Terkelsen, *Arch. Biochem. Biophys.*, 157,177 (1973).]

No new peaks were observed. However, the peak corresponding to t=173.0 min increased in relative intensity. This peak was therefore attributed to L-2-amino-4-(2-aminoethoxy)butanoic acid.

The other neighboring peaks (t=167.2 min and 169.5 min) were attributed respectively to ornithine (Orn) and lysine (lys). In this case the undiluted broth (1ml) was mixed with Orn (0.5 nmoles) and lys (2.5nmoles) and the fluorometric amino acid analysis repeated under the same conditions as above. The peaks at t=167.2 and 169.5 min increased in relative intensity and were concluded to be Orn and Lys respectively.

EXAMPLE 2

Analysis of the fermentation Broth for L-2-amino-4-(2-aminoethoxy)-butanoic acid The crude fermentation broth obtained as described in Example 1 above was centrifuged and subsequently ultrafiltered using a Millipore filtering centrifuge tube equipped with the Amicon PM-10 membrane. The pH of the filtrate was adjusted with one normal HCL to Table 1 — Continued

| Fermentation Media | |
|---|---|
| Media Composition | g/l |
| BB Broth: | |
| Glucose | 2.0 |
| K$_2$HPO$_4$ | 7.0 |
| KH$_2$PO$_4$ | 3.0 |
| Na$_3$ citrate.2H$_2$O | 0.5 |
| MgSO$_4$.7H$_2$O | 0.1 |
| (NH$_4$)$_2$SO$_4$ | 1.0 |
| CB Broth: | |
| Glucose | 10.0 |
| N-Z-Amine Type A (Sheffield) | 10.0 |
| MgCl$_2$.6H$_2$O | 0.2 |
| CaCl$_2$.2H$_2$O | 0.025 |
| FeCl$_3$.6H$_2$O | 0.001 |
| ZnCl$_2$ | 0.0005 |
| CuCl$_2$.2H$_2$O | 0.0005 |
| MnCl$_2$.2H$_2$O | 0.0005 |
| CC Broth: | |
| Monosodium glutamate | 10.0 |
| Glucose | 10.0 |
| K$_2$HPO$_4$ | 4.0 |
| KH$_2$PO$_4$ | 2.0 |
| MgCl$_2$.6H$_2$O | 0.2 |
| CaCl$_2$.2H$_2$O | 0.025 |
| FeCl$_3$.6H$_2$O | 0.001 |
| ZnCl$_2$ | 0.0005 |
| CuCl$_2$.2H$_2$O | 0.0005 |
| MnCl$_2$.2H$_2$O | 0.0005 |
| CD Broth: | |
| Soyalose (Central Soya) | 10.0 |
| Soluble starch (Nutritional Biochemical) | 10.0 |
| Corn steep liquor (Corn Products) | 0.5 |
| K$_2$HPO$_4$ | 0.5 |
| CaCO$_3$ | 0.5 |
| pH adjusted to 7.5 | 0.5 |
| CE Broth: | |
| Glucose (Cerelose—Corn Products) | 10.0 |
| Bacto-peptone (Difco) | 5.0 |
| Bacto-yeast extract (Difco) | 3.0 |
| Fe(NH$_4$)$_2$(SO$_4$)$_2$.6H$_2$O | 0.031 |

We claim:
1. A process for preparing L-2-amino-4-(2-aminoethoxy)-butanoic acid which comprises cultivating *Streptomyces sp.* X–11085 NRRL 5331 in an aqueous nutrient medium containing assimilable sources of carbohydrates, nitrogen and inorganic salts under submerged aerobic conditions, and then recovering L-2-amino-4-(2-aminoethoxy)-butanoic acid from the aqueous medium.

2. A process according to claim 1 in which recovery of L-2-amino-4-(2-aminoethoxy)-butanoic acid is accomplished by filtering the aqueous medium, absorbing L-2-amino-4-(2-aminoethoxy)-butanoic acid on a cation exchange resin and retrieving L-2-amino-4-(2-aminoethoxy)-butanoic acid from the resin.

* * * * *